March 30, 1937. L. J. MARTIN 2,075,585
VEHICLE AND SPRING SUSPENSION THEREFOR
Filed May 11, 1934 2 Sheets-Sheet 2
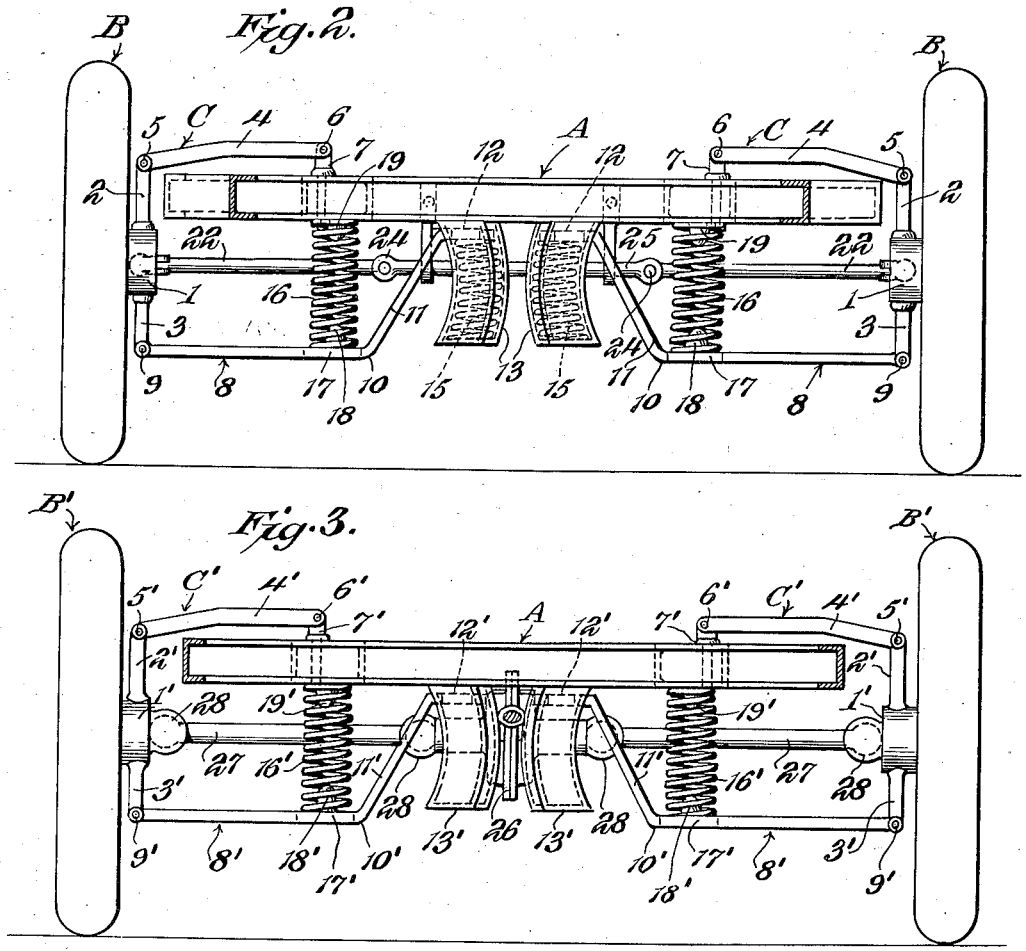
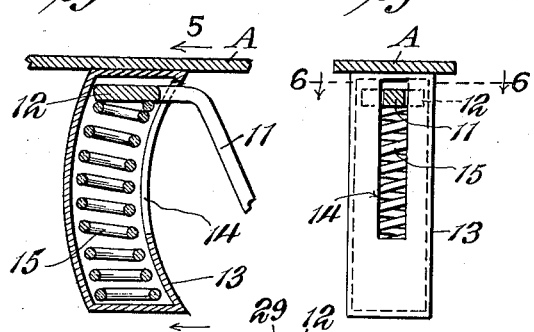
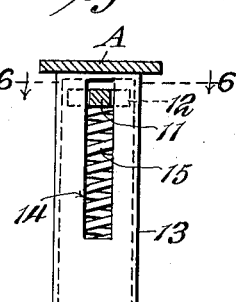
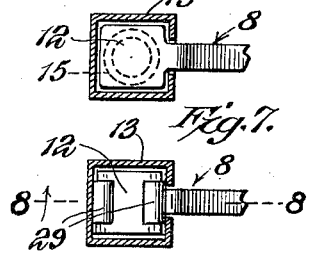
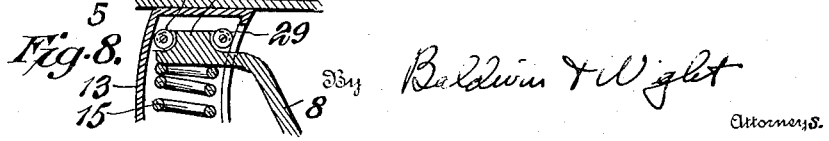

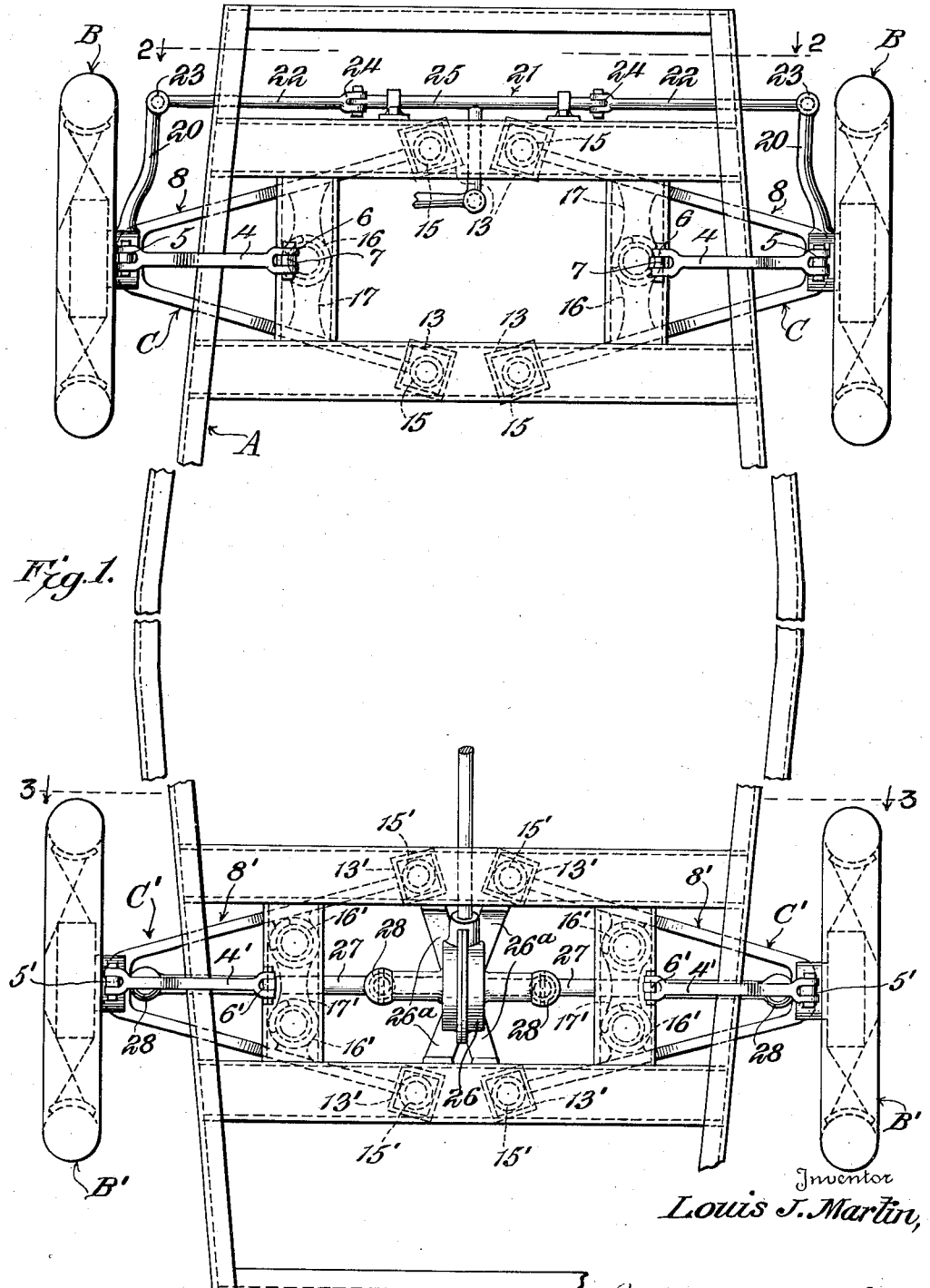

Patented Mar. 30, 1937

2,075,585

UNITED STATES PATENT OFFICE 2,075,585

VEHICLE AND SPRING SUSPENSION THEREFOR

Louis J. Martin, Galveston, Tex.

Application May 11, 1934, Serial No. 725,155

12 Claims. (Cl. 267—20)

This invention relates to vehicles and more particularly to spring suspensions therefor.

In the conventional types of automotive vehicles heretofore most generally used, the front wheels have been mounted on a rigid axle assembly extending transversely of the vehicle chassis or frame and the rear wheels mounted on axles journalled in a rigid housing extending transversely of the frame, as a result of which any high or low spot in the road encountered by any one wheel must necessarily effect movement, not only of that wheel, but also of the wheel mounted on the other end of the associated axle or axle housing. This has caused considerable difficulty in steering and has resulted in poor riding qualities and roadability. It has been proposed in order to eliminate this simultaneous wheel movement and to provide for better riding qualities, to mount each wheel individually and to provide individual spring suspensions between each wheel and the frame so as to restrict vertical wheel movement to only the wheel which actually encounters an unevenness in the road.

An object of the present invention is to provide a vehicle having novel and improved individual wheel suspension means whereby a maximum of resilient localized spring action is obtained.

Another object is to provide an individual wheel suspension including a floating member in combination with spring means adapted to exert opposed vertical pressures on the floating member. Further objects will become apparent from a reading of the following description, the appended claims and the accompanying drawings, in which:

Figure 1 is a top plan view of a vehicle chassis equipped with spring suspension in accordance with my invention;

Figure 2 is a vertical, sectional view taken on the line 2—2 of Figure 1, parts being shown in elevation;

Figure 3 is a vertical sectional view taken on the line 3—3 of Figure 1, parts being shown in elevation;

Figure 4 is a detail view in vertical section and on an enlarged scale showing a guide boxing and associated parts;

Figure 5 is a view in vertical section taken on the line 5—5 of Figure 4, parts being shown in elevation;

Figure 6 is a view in horizontal section taken on the line 6—6 of Figure 5;

Figure 7 is a view similar to Figure 6, but showing a modification; and

Figure 8 is a view similar to Figure 5, but showing the modification.

For the purpose of illustration, the at present preferred form of the invention is shown in the drawings in which A generally designates a vehicle chassis, B—B and B' B' the front and rear wheels respectively, and CC and C' C' the spring suspensions for the wheels B—B'—C—C' respectively.

Each of the front wheels B is mounted on the chassis by a spring suspension C including an axle bearing 1 provided with upper and lower extensions 2 and 3, respectively, having swivel connection with the bearing 1 so as to permit steering movements of the wheel. A link 4 is pivoted as at 5 to the upper bearing extension 2 and is pivoted as at 6 to a lug 7 on the chassis A, this lever permitting constrained relative movement of the wheel vertically with respect to the chassis or frame.

A floating wish-bone member or lever 8 has its bight pivotally connected as at 9 to the lower bearing extension 3, the two arms of the wish-bone member extending inwardly towards the center of the chassis A. Each arm of the lever 8 is bent or curved upwardly as at 10 to provide an inclined or upwardly extending part 11 terminating in a substantially horizontal and enlarged end portion 12, which is housed for guided substantially vertical movements in a guide boxing 13 of slightly arcuate shape carried by the chassis. Each guide boxing is provided with a slot 14 through which the associated floating lever arm extends and in which the arm is permitted to move substantially vertically.

A coil spring 15 is interposed between the enlarged end part 12 of each floating lever arm and the bottom of the associated guide boxing and is adapted to exert upward pressure on the associated lever arm. A coil spring 16 is interposed between the chassis and a cross piece 17 extending between the arms of each lever 8 intermediate the ends thereof. Projections 18 and 19 on the cross pieces 17 and the chassis, respectively, serve to maintain the springs 16 in position.

It is desirable to effect simultaneous steering movements of the front wheels B—B without interfering with the individual vertical movement of each wheel. To this end each front wheel bearing 1 is provided with a steering arm 20, the two steering arms being connected by means of a jointed steering bar 21 which, as shown, comprises end sections end 22—22 pivoted to the respective steering arms as at 23—23, and each having its inner end provided with a clevis 24 for connection to a central section 25. It is apparent that although the steering bar 21 connects the arms 20 for simultaneous steering movements in a horizontal plane, either arm 20 can move with its associated wheel in a vertical plane without causing substantial movement of the other arm and its associated wheel. The steering bar 21, which comprises the articulated sections 22, 22 and 25 is adapted to be moved longitudinally by means of an operating device 25ª pivotally connected as at 25ᵇ to the central section 25 and leading to a steering mechanism (not shown).

In the wheel suspensions C' C' for the rear wheels the bearing extensions 2' and 3' do not have swivel connection with the associated wheel bearings 1' 1', but instead are rigidly connected thereto. Two springs 16' are interposed between each cross piece 17' and the chassis. In other respects the suspensions for the rear wheels B' are the same as the suspensions for the front wheels and therefore need not be described further. For convenience, however, the parts of suspensions C' are designated by reference numerals corresponding to the reference numerals applied to similar parts of the suspension C with the exception that the reference numerals applied to the parts of the suspension C' are primed. Thus the links 4' 4' of the suspension C' C' are similar to links 4 and 4 of the suspensions C—C, etc.

The rear of the vehicle is provided with a differential housing 26 rigidly connected to the chassis by brackets 26a and with the driving shafts 27—27 extending from the differential housing to the wheel axles, these shafts being provided with universal joints 28 so as to permit vertical movement of the wheels B' B' independently of any movement of the differential housing.

In operation the weight of the vehicle body and chassis will be borne directly by the springs 16 and 16', the load being transmitted through these springs and the floating levers 8 and 8' to the springs 15 and thence to the bottom of the guide boxings 13. The arrangement is such that a high degree of resilient spring action is obtainable in each wheel suspension without affecting materially the positions of the other wheels relative to the frame, resulting in improved riding qualities and roadability of the vehicle.

In the modification shown in Figures 7 and 8 the enlarged inner end portions 12 of the floating levers 8 are provided with rollers 29 adapted to contact opposite inner faces of the guide boxing so as to permit movement of the inner ends of the floating levers within the guide boxing with a minimum of frictional resistance.

Although the embodiment of my invention shown and described herein by way of illustration is a practical and the at present preferred form, it will be understood that various changes may be made in the construction and relative arrangement of the parts without departing from the invention as defined in the claims.

I claim:

1. In a vehicle, the combination of a frame; an axle bearing; and a spring suspension comprising a link connection between the frame and bearing, a floating member having one of its ends connected to the bearing and having its other end mounted for approximately vertical movements of substantial magnitude, and spring means interposed between the frame and said floating member and positioned to exert opposing pressures on the latter, said link connection and said floating member both extending substantially transversely with respect to said frame.

2. In a vehicle, the combination of a frame; an axle bearing; and a spring suspension comprising a connection between the frame and bearing adapted to permit constrained relative movement between the bearing and frame, a floating member having one of its ends connected to the bearing and having its other end mounted for approximately vertical movements of substantial magnitude, and spring means interposed between the frame and said floating member and positioned to exert opposing pressures on the latter, said connection and said floating member both extending substantially transversely with respect to said frame.

3. In a vehicle, the combination of a frame; an axle bearing; and a spring suspension comprising a connection between the frame and bearing adapted to permit constrained relative movement between the bearing and frame, a floating member having one of its ends connected to the bearing and having its other end mounted for approximately vertical movements of substantial magnitude, and spring means interposed between the frame and said floating member and positioned at spaced points on said floating member to exert opposing pressures on the latter.

4. In a vehicle, the combination of a frame; an axle bearing; and a spring suspension comprising a link connection between the frame and bearing, a floating member having one of its ends connected to the bearing and having its other end mounted for approximately vertical movements of substantial magnitude, and spring means interposed between the frame and said floating member and positioned at spaced points on said floating member to exert opposing pressures on the latter, said link connection and said floating member both extending substantially transversely with respect to said frame.

5. In a vehicle, the combination of a frame; an axle bearing; and a spring suspension comprising a link connection between the frame and bearing, a floating lever having one of its ends connected to said bearing, and having its other end mounted for approximately vertical movements of substantial magnitude, means for guiding said other end of said floating lever for substantially vertical movements, and spring means connected to said frame and lever and arranged to exert opposing pressures on the latter, said link connection and said floating lever both extending substantially transversely with respect to said frame.

6. In a vehicle, the combination of a frame; an axle bearing; and a spring suspension comprising a link connection between the frame and bearing, a floating lever pivotally connected at one of its ends to said bearing, means engaging the opposite end of said floating lever on surfaces substantially transverse to said lever for guiding said opposite end of the lever for substantially vertical movements, a spring interposed between said frame and said lever intermediate the ends of the lever for exerting downward force on the latter, and a spring interposed between the frame and the guided end portion of the lever for exerting an upward force on the latter.

7. In a vehicle, the combination of a frame; an axle bearing; and a spring suspension comprising a link connection between the frame and bearing, a floating lever pivotally connected at one of its ends to said bearing, means for guiding the opposite end of the lever for substantially vertical movements, a roller mounted on said guided end of said lever and contacting said guide means, a spring interposed between said frame and said lever intermediate the ends of the lever for exerting downward force on the latter, and a spring interposed between the frame and the guided end portion of the lever for exerting an upward force on the latter.

8. In a vehicle, the combination of a frame; an axle bearing; and a spring suspension comprising a link connection between the frame and bearing, a lever pivotally connected at one of its ends to said bearing, a guide boxing connected to said frame and having a slot through which the opposite end of said lever extends, and spring means interposed between said frame and said lever for exerting opposing forces on the latter including a spring housed in said guide boxing.

9. A combination as defined in claim 1 in which the floating member comprises a wish-bone member having its bight connected to the bearing and in which similar spring means are associated with each arm of the wish-bone member.

10. A combination as defined in claim 5 in which the lever comprises a wish-bone member having its bight pivotally connected to said bearing and in which similar guiding and spring means are associated with each arm of the wishbone member.

11. In a vehicle, the combination of a frame; an axle bearing; and a spring suspension comprising a link connection between the frame and bearing and extending transversely of the frame, a floating lever pivotally connected at one of its ends to said bearing and extending transversely of the frame, an arcuate guide boxing connected to said frame and having a slot through which the opposite end of said lever extends for cooperation with said guide boxing, and spring means interposed between said frame and said lever for exerting opposing forces on the latter including a spring housed in said guide boxing.

12. In a vehicle, the combination of a frame; an axle bearing; and a spring suspension comprising a link connection between the frame and bearing, and a floating member having one of its ends connected to said bearing and having its other end mounted for approximately vertical movements of substantial magnitude, said link connection and said floating member both extending substantially transversely with respect to said frame.

LOUIS J. MARTIN.